(12) United States Patent
Sugiyama et al.

(10) Patent No.: US 9,446,790 B2
(45) Date of Patent: Sep. 20, 2016

(54) ELECTRIC POWER STEERING SYSTEM

(71) Applicant: JTEKT CORPORATION, Osaka-shi, Osaka (JP)

(72) Inventors: Toyoki Sugiyama, Kitakatsuragi-gun (JP); Masayasu Higashi, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 20 days.

(21) Appl. No.: 14/071,209

(22) Filed: Nov. 4, 2013

(65) Prior Publication Data
US 2014/0136055 A1    May 15, 2014

(30) Foreign Application Priority Data

Nov. 15, 2012  (JP) .................................. 2012-251132

(51) Int. Cl.
*B62D 5/04* (2006.01)

(52) U.S. Cl.
CPC ............. *B62D 5/0481* (2013.01); *B62D 5/046* (2013.01)

(58) Field of Classification Search
CPC .. B25D 5/0481; B25D 5/046; B25D 5/0457; H02P 29/028; H02P 6/085; B60L 15/2045; B60L 3/0046; B60L 7/16; B60L 11/005; B60W 10/26; B60W 10/06; B60W 10/184; B62D 5/065
USPC ................. 701/41, 42, 70; 363/54; 180/443; 320/103; 307/43, 53
See application file for complete search history.

(56) References Cited

U.S. PATENT DOCUMENTS

| 6,052,633 | A   | * | 4/2000  | Fukuyama ............. | B62D 5/065 180/400 |
| 8,204,651 | B2  |   | 6/2012  | Tachibana et al. | |
| 9,030,181 | B2  | * | 5/2015  | Ura ........................ | B62D 5/046 320/116 |
| 2005/0035737 | A1 | * | 2/2005  | Elder .................... | B60L 3/0046 320/103 |
| 2007/0279949 | A1 | * | 12/2007 | Yokota ............................ | 363/54 |

(Continued)

FOREIGN PATENT DOCUMENTS

| DE | 10 2011 056210 A1 | 6/2012 |
| EP | 2 208 658 A1 | 7/2010 |
| EP | 2 208 660 A1 | 7/2010 |

(Continued)

OTHER PUBLICATIONS

Mar. 20, 2015 Search Report issued in European Patent Application No. 13 19 2688.3.

(Continued)

*Primary Examiner* — Yuri Kan
(74) *Attorney, Agent, or Firm* — Oliff PLC (57) ABSTRACT

An electric power steering system includes: an electric motor that generates assist torque; an auxiliary power supply device including a capacitor connected to a main power supply and discharging electric power to the electric motor; and a control device that controls the auxiliary power supply device. There is a plurality of modes of connection between the main power supply and the auxiliary power supply device. The control device switches the mode of connection between the main power supply and the auxiliary power supply device, depending on the situation.

10 Claims, 7 Drawing Sheets

(56) References Cited

U.S. PATENT DOCUMENTS

| | | | |
|---|---|---|---|
| 2009/0309422 A1* | 12/2009 | Helmick | B60L 7/16 307/53 |
| 2010/0211266 A1* | 8/2010 | Nagase | B62D 5/0457 701/41 |
| 2010/0263960 A1* | 10/2010 | Nagase | B62D 5/046 180/443 |
| 2011/0098889 A1* | 4/2011 | Oya | B62D 5/0457 701/41 |
| 2012/0068537 A1* | 3/2012 | Hintz | B60L 11/005 307/43 |
| 2012/0150406 A1* | 6/2012 | Tomura | B60W 10/06 701/70 |
| 2013/0285667 A1* | 10/2013 | Koduka | G01R 19/0084 324/433 |

FOREIGN PATENT DOCUMENTS

| | | |
|---|---|---|
| EP | 2 226 236 A1 | 9/2010 |
| JP | 2007-153107 A | 6/2007 |
| JP | A-2009-166679 | 7/2009 |

OTHER PUBLICATIONS

Aug. 2, 2016 Office Action issued in Japanese Patent Application No. 2012-251132.

* cited by examiner

| CONNECTION MODE | CHARGING AND DISCHARGING CIRCUIT | | BOOSTER CIRCUIT | | SWITCHING CIRCUIT | |
|---|---|---|---|---|---|---|
| | FET1 | FET2 | FET3 | FET4 | FET5 | FET6 |
| FIRST CONNECTION MODE | OFF-STATE | ON-STATE | OFF-STATE | OFF-STATE | ON-STATE | OFF-STATE |
| SECOND CONNECTION MODE | ON-STATE | OFF-STATE | OFF-STATE | OFF-STATE | ON-STATE | OFF-STATE |
| THIRD CONNECTION MODE | OFF-STATE | ON-STATE | $\overline{PWM}$ | PWM | ON-STATE | OFF-STATE |
| FOURTH CONNECTION MODE | OFF-STATE | ON-STATE | ON-STATE | OFF-STATE | OFF-STATE | ON-STATE |

ELECTRIC POWER STEERING SYSTEM

INCORPORATION BY REFERENCE

The disclosure of Japanese Patent Application No. 2012-251132 filed on Nov. 15, 2012 including the specification, drawings and abstract, is incorporated herein by reference in its entirety.

BACKGROUND OF THE INVENTION

1. Field of the Invention

The invention relates to an electric power steering system including an auxiliary power supply.

2. Description of the Related Art

One of the conventional electric power steering system includes an auxiliary power supply device connected in series with a main power supply. The electric power steering system makes a switchover between charging to a capacitor serving as an auxiliary power supply from the main power supply and discharging to a motor driving circuit from the main power supply and the capacitor, based on a charging and discharging threshold changed on the basis of an energy residual amount in the capacitor. Japanese Patent Application Publication No. 2009-166679 (JP 2009-166679 A) describes an example of the configuration of such a conventional electric power steering system.

The conventional electric power steering system is configured such that the capacitor discharges electric power to the motor driving circuit, and is not configured such that the capacitor discharges electric power to the main power supply. Thus, it is not possible to supply electric power to the main power supply from the capacitor.

SUMMARY OF THE INVENTION

One object of the invention is to provide an electric power steering system configured such that an auxiliary power supply device is able to supply electric power to a main power supply.

An electric power steering system according to an aspect of the invention includes: an electric motor that generates assist torque based on steering torque; a main power supply that supplies electric power to the electric motor; an auxiliary power supply device including an auxiliary power supply connected to the main power supply and capable of discharging electric power to the electric motor; and a control device that controls an operation of the auxiliary power supply device. The control device switches a mode, as a mode of connection between the main power supply and the auxiliary power supply device, among a first supply mode in which the main power supply and the auxiliary power supply are connected in series with each other and a high-potential side of the auxiliary power supply is connected to the electric motor, a second supply mode in which the main power supply and the auxiliary power supply are connected in series with each other and a low-potential side of the auxiliary power supply is connected to the electric motor, and a main power supply charging mode in which the main power supply and the auxiliary power supply are connected in parallel to each other.

In the above-described electric power steering system, when the connection mode is switched to the main power supply charging mode by the control device, the main power supply and the auxiliary power supply are connected in parallel to each other. Accordingly, when the voltage of the main power supply is lower than the voltage of the auxiliary power supply, electric power can be supplied from the auxiliary power supply to the main power supply, in the electric power steering system.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
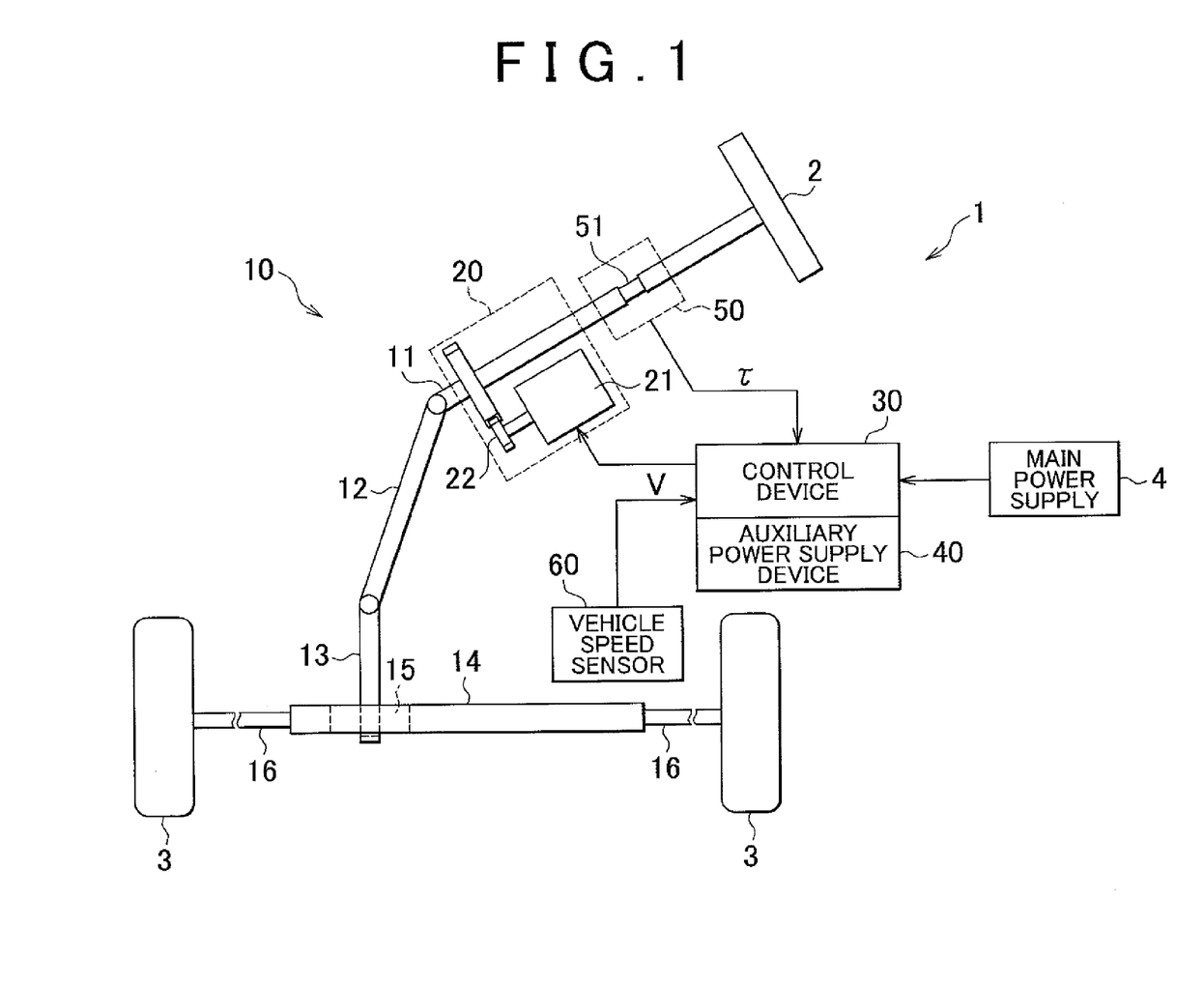
FIG. 1 is a schematic diagram illustrating the configuration of an electric power steering system according to an embodiment of the invention.

With reference to FIG. 1, the configuration of an electric power steering system 1 (hereinafter, referred to as "EPS 1") according to an embodiment of the invention will be described below. The EPS 1 includes an EPS main body 10, an assist device 20, a control device 30, an auxiliary power supply device 40, a torque sensor 50, and a vehicle speed sensor 60. The EPS 1 is configured such that electric power is supplied to the assist device 20 from a main power supply 4 and the auxiliary power supply device 40 via the control device 30. The EPS 1 assists an operation of a steering wheel 2 with the use of the assist device 20, based on signals output from the torque sensor 50 and the vehicle speed sensor 60.

The EPS main body 10 includes a column shaft 11, an intermediate shaft 12, a pinion shaft 13, a rack shaft 14, a rack-and-pinion mechanism 15, and two tie rods 16. The EPS main body 10 rotates the column shaft 11, the intermediate shaft 12, and the pinion shaft 13 together with each other in response to the rotation of the steering wheel 2. The EPS main body 10 changes the steered angle of wheels 3 by causing the rack shaft 14 to make a reciprocating motion with the rotation of the pinion shaft 13.

The rack-and-pinion mechanism 15 has a configuration in which a pinion gear (not shown) of the pinion shaft 13 and a rack gear (not shown) of the rack shaft 14 mesh with each other. The rack-and-pinion mechanism 15 converts the rotation of the pinion shaft 13 into a reciprocating motion of the rack shaft 14 due to the mesh between the pinion gear and the rack gear.

The assist device 20 includes an electric motor 21, which is a three-phase brushless motor, and a speed reduction mechanism 22. The assist device 20 applies, to the column shaft 11, a force (hereinafter referred to as "assist torque") for rotating the column shaft 11 by transmitting the rotation of the electric motor 21 to the column shaft 11 via the speed reduction mechanism 22. As described above, the EPS 1 according to the present embodiment has a column-assist type configuration.

The output level of a voltage signal output from the torque sensor 50 changes on the basis of the torsion of a torsion bar 51 connected to an intermediate portion of the column shaft 11, that is, the magnitude of a torque (hereinafter, referred to as "steering torque $\tau$") applied to the column shaft 11 in response to the operation of the steering wheel 2. The torque sensor 50 outputs the voltage signal to the control device 30.

The output level of a voltage signal output from the vehicle speed sensor 60 changes on the basis of the rotational speed of a drive shaft (not shown) of a vehicle, that is, a vehicle travelling speed (hereinafter referred to as "vehicle speed V"). The vehicle speed sensor 60 outputs the voltage signal to the control device 30.

The control device 30 calculates the magnitude of the steering torque $\tau$ and the direction thereof based on the voltage signal from the torque sensor 50. The control device 30 calculates the vehicle speed V based on the voltage signal from the vehicle speed sensor 60. The control device 30 executes assist control for assisting steering. More specifically, the control device 30 calculates a target assist torque based on the steering torque $\tau$ and the vehicle speed V. Then, the control device 30 controls the operation of the electric motor 21 by supplying the electric motor 21 with electric power corresponding to the target assist torque. The electric motor 21 generates an assist torque based on the target assist torque.

Figure 2:
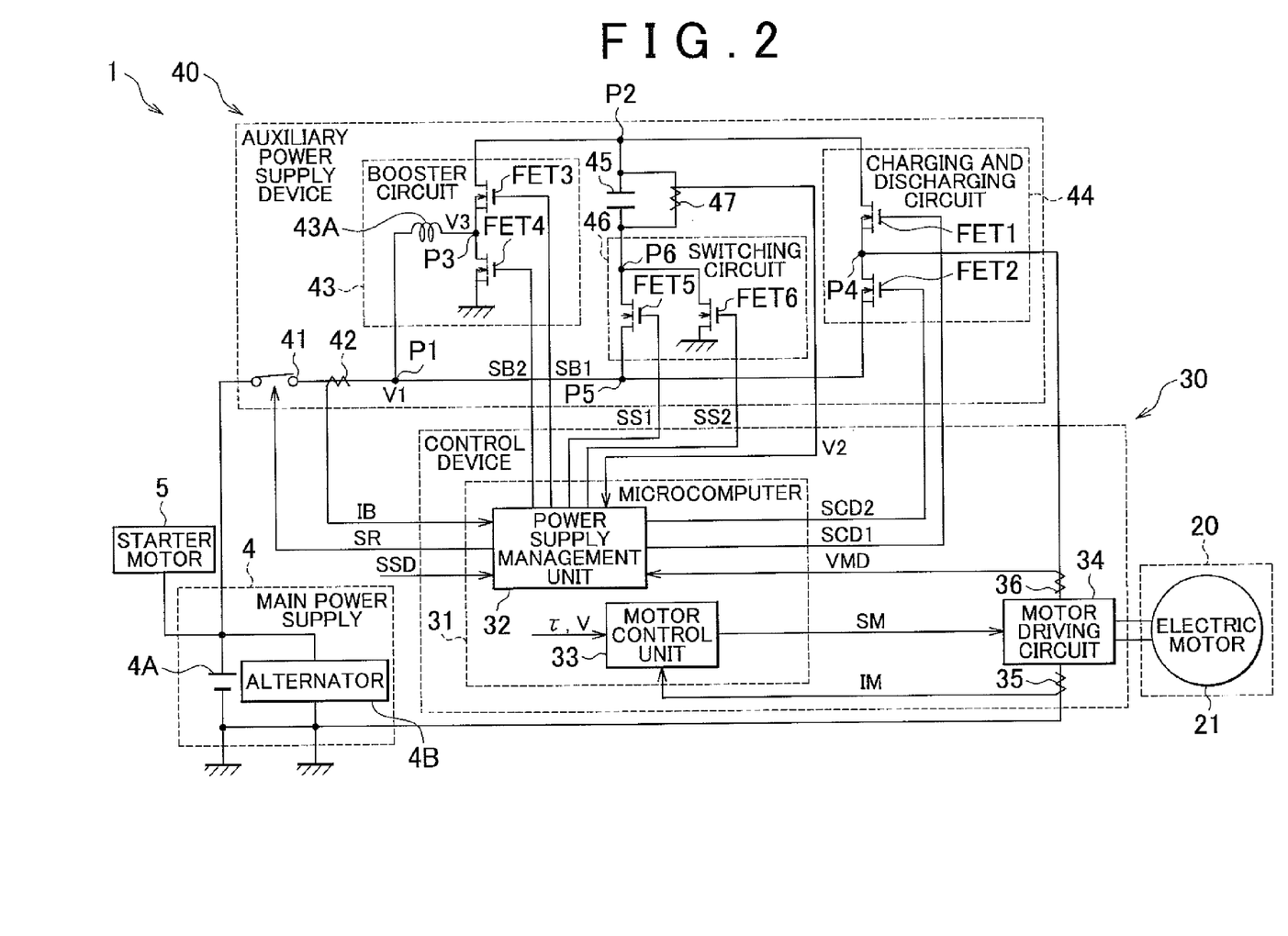
FIG. 2 is a circuit diagram illustrating the circuit configuration of the electric power steering system according to the embodiment.

With reference to FIG. 2, the detailed configurations of the main power supply 4, the control device 30, and the auxiliary power supply device 40 will be described. The main power supply 4 includes an in-vehicle battery 4A and an alternator 4B. The main power supply 4 has a configuration in which the in-vehicle battery 4A and the alternator 4B are connected in parallel to each other. One end of the main power supply 4 is connected in series with the auxiliary power supply device 40 and a starter motor 5, and the other end thereof is grounded. Note that the starter motor 5 corresponds to a starter.

The alternator 4B generates electric power when an output shaft of the alternator 4B rotates with the rotation of a crankshaft (not shown) of an internal combustion engine (not shown) of the vehicle. The alternator 4B supplies the electric power thus generated to the in-vehicle battery 4A. When the electric power is supplied from the main power supply 4 to the starter motor 5 in order to start the internal combustion engine, the starter motor 5 rotates the crankshaft.

The control device 30 includes a microcomputer 31, a motor driving circuit 34, a current sensor 35, and a voltage sensor 36. The control device 30 controls an operation of the motor driving circuit 34 and an operation of the auxiliary power supply device 40 with the use of the microcomputer 31.

The output level of a voltage signal output from the current sensor 35 changes on the basis of the magnitude of actual current (hereinafter referred to as "motor current IM") supplied to the electric motor 21. The current sensor 35 outputs the voltage signal to a motor control unit 33 of the microcomputer 31.

The output level of a voltage signal output from the voltage sensor 36 changes on the basis of the magnitude of the voltage between the auxiliary power supply device 40 and the motor driving circuit 34, that is, the voltage that is applied to the motor driving circuit 34 (hereinafter, referred to as "motor drive voltage VMD"). The voltage sensor 36 outputs the voltage signal to a power supply management unit 32 of the microcomputer 31.

The microcomputer 31 includes the power supply management unit 32 and the motor control unit 33. The microcomputer 31 controls the charging and discharging operation of the auxiliary power supply device 40 with the use of the power supply management unit 32. The microcomputer 31 controls the operation of the motor driving circuit 34 with the use of the motor control unit 33.

The power supply management unit 32 controls the operations of a relay 41, a booster circuit 43, a charging and discharging circuit 44, and a switching circuit 46 of the auxiliary power supply device 40. The power supply management unit 32 outputs, to the relay 41, a relay signal SR for controlling the operation of the relay 41. The power supply management unit 32 outputs, to the booster circuit 43, booster signals SB1, SB2 for controlling the operation of the booster circuit 43. The power supply management unit 32 outputs, to the charging and discharging circuit 44, charging and discharging signals SCD1, SCD2 for controlling the operation of the charging and discharging circuit 44. The power supply management unit 32 outputs, to the switching circuit 46, switching signals SS1, SS2 for controlling the operation of the switching circuit 46.

The motor control unit 33 calculates the target assist torque based on the steering torque $\tau$ and the vehicle speed V. The motor control unit 33 executes current feedback control such that the motor current IM coincides with a current command value corresponding to the target assist torque. The motor control unit 33 outputs, to the motor driving circuit 34, a motor control signal SM generated through execution of the current feedback control. Note that the motor control signal SM functions also as a signal for executing PWM control on the motor driving circuit 34. Further, the target assist torque increases as the absolute value of the steering torque $\tau$ increases or as the absolute value of the vehicle speed V decreases.

The motor driving circuit 34 has a known configuration in which two switching elements (MOSFETs) are connected in series with each of the phases of the electric motor 21. In the motor driving circuit 34, the two switching elements of each of the phases of the motor driving circuit 34 are alternately switched between the on-state and the off-state based on the motor control signal SM from the motor control unit 33. The motor driving circuit 34 applies the motor drive voltage VMD to the electric motor 21, through PWM driving, on the basis of the switching of each of the switching elements between the on-state and the off-state.

The auxiliary power supply device 40 is formed separately from the main power supply 4. The auxiliary power supply device 40 includes the relay 41, a current sensor 42, the booster circuit 43, the charging and discharging circuit 44, and a capacitor 45 as an auxiliary power supply, the switching circuit, 46, and a voltage sensor 47. The auxiliary power supply device 40 is capable of discharging electric power to the electric motor 21 and is capable of discharging electric power to the main power supply 4 with the use of the capacitor 45.

The relay 41 is arranged between the main power supply 4 and the booster circuit 43. The relay 41 switches the power supply state between the on-state in which the main power supply 4 supplies electric power to the motor driving circuit 34 and the off-state in which the main power supply 4 does not supply electric power to the motor driving circuit 34.

The current sensor 42 is arranged between the relay 41 and the booster circuit 43. The output level of a voltage signal output from the current sensor 42 changes on the basis of the magnitude of a current (hereinafter referred to "battery current IB") output from the main power supply 4. The current sensor 42 outputs the voltage signal to the power supply management unit 32.

The booster circuit 43 boosts the output voltage based on the voltage (battery voltage) of the main power supply 4, that is, the output voltage at a connecting point P1 between the main power supply 4 and the booster circuit 43 (hereinafter referred to as "output voltage V1"), and applies the boosted output voltage to a connecting point P2, which is an positive terminal of the capacitor 45, thereby charging the capacitor 45.

The booster circuit 43 includes a pair of switching elements (hereinafter referred to as "a FET 3 and a FET 4"), and a boosting coil 43A. The booster circuit 43 has a configuration in which the FET 3 and the FET 4 are connected in series with each other. The booster circuit 43 has a configuration in which one end of the boosting coil 43A is connected to a connecting point P3 between the FET 3 and the FET 4. The booster circuit 43 has a configuration in which the output voltage V1 is applied to the other end of the boosting coil 43A.

As the FET 3 and the FET 4, MOSFETs are employed. One end of the FET 3 on the upper side is connected to the positive terminal (the connecting point P2) of the capacitor 45. One end of the FET 4 on the lower side is grounded. The FET 3 and the FET 4 are switched between the on-state and the off-state based on the booster signals SB1, SB2 from the power supply management unit 32, respectively.

The charging and discharging circuit 44 is connected in parallel with the booster circuit 43. The charging and discharging circuit 44 includes a pair of switching elements (hereinafter referred to as "a FET 1 and a FET 2"). The charging and discharging circuit 44 has a configuration in which the FET 1 and the FET 2 are connected in series with each other. The charging and discharging circuit 44 is connected to the motor driving circuit 34 at a connecting point P4 between the FET 1 and FET 2.

As the FET 1 and the FET 2, MOSFETs are employed. One end of the FET 1 on the upper side is connected to the positive terminal (the connecting point P2) of the capacitor 45. One end of the FET 2 on the lower side is connected to the main power supply 4 via the relay 41 and the current sensor 42. The FET 1 and FET 2 are periodically switched between the on-state, which is a conductive state, and the off-state, which is a nonconductive state, based on the charging and discharging signals SCD1, SCD2 from the power supply management unit 32, respectively. In the on-state, the FET 1 is in a state where electric power can be discharged from the capacitor 45 (the auxiliary power supply device 40) to the motor driving circuit 34 (the electric motor 21). In the off-state, the FET 1 is in a state where electric power cannot be discharged from the capacitor 45 (the auxiliary power supply device 40) to the motor driving circuit 34 (the electric motor 21). In the on-state, the FET 2 is in a state where electric power can be supplied from the main power supply 4 to the motor driving circuit 34 via the FET 2. In the off-state, the FET 2 is in a state where electric power cannot be supplied from the main power supply 4 to the motor driving circuit 34 via the FET 2.

Between the booster circuit 43 and the charging and discharging circuit 44, the capacitor 45 is connected in parallel with the booster circuit 43 and the charging and discharging circuit 44. One end of the capacitor 45 is connected to the connecting point P2, and the other end of the capacitor 45 is connected to the switching circuit 46. In the capacitor 45, the connecting point P2-side is a high-potential side, and the switching circuit 46-side is a low-potential side. As the capacitor 45, an electric double layer capacitor is used.

The voltage sensor 47 is connected in parallel to the capacitor 45. The voltage sensor 47 outputs a signal corresponding to the voltage of the capacitor 45 (hereinafter referred to as "output voltage V2") to the power supply management unit 32. The switching circuit 46 is located between the capacitor 45 and the main power supply 4. The switching circuit 46 includes two switching elements (hereinafter referred to "a FET 5 and a FET 6"). The switching circuit 46 changes the mode of connection between the capacitor 45 and the main power supply 4. Note that the FET 5 corresponds to a first switching element. The FET 6 corresponds to a second switching element.

The FET 5 is connected in series with the main power supply 4 and the capacitor 45. One end of the FET 5 is connected to the capacitor 45, and the other end of the FET 5 is connected to a connecting point P5 between the current sensor 42 and the FET 2. When the FET 5 is in the on-state, the main power supply 4 and the capacitor 45 are brought into a conductive state via the FET 5. When the FET 5 is in the off-state, the main power supply 4 and the capacitor 45 are brought into a non-conductive state (conduction between the main power supply 4 and the capacitor 45 via the FET 5 is interrupted).

The FET 6 is located on an electric power supply line that branches off from a connecting point P6 between the FET 5 and the capacitor 45. One end of the FET 6 is connected in series with the connecting point P6, and the other end of the FET 6 is grounded. When the FET 6 is in the on-state, the connecting point P6 is grounded via the FET 6. When the FET 6 is in the off-state, the connecting point P6 is not grounded via the FET 6.

The operation of the relay 41 will be described below. The relay 41 is switched between the on-state and the off-state based on the relay signal SR from the power supply management unit 32. When an ignition switch (not shown) of the vehicle is turned on, the relay 41 is switched from the off-state to the on-state. When the ignition switch is turned off, the relay 41 is switched from the on-state to the off-state.

The operation of the booster circuit 43 will be described below. The booster circuit 43 applies, to the positive terminal (the connecting point P2) of the capacitor 45, a boosted voltage V3 generated when the FET 4 on the lower side is switched from the on-state to the off-state. In the booster circuit 43, the FET 4 becomes conductive in the on-state, so that one end of the boosting coil 43C is grounded. Then, the booster circuit 43 superimposes, on the output voltage V1, an induced voltage generated in the boosting coil 43A when the FET 4 is switched from the off-state to the on-state, and outputs the thus obtained voltage. Note that the FET 3 on the upper side has a function of preventing a current from flowing from the capacitor-45 side to the booster-circuit-43 side (back-flow).

The operation of the charging and discharging circuit 44 will be described below. The charging and discharging circuit 44 switches the power supply mode between a first power supply mode in which the capacitor 45 can be charged with electric power from the main power supply 4 and a second power supply mode in which the capacitor 45 can discharge electric power to the motor driving circuit 34, based on a combination of the on-state and the off-state of the FET 1 and the FET 2. Note that the FET 1 and the FET 2 are controlled by the power supply management unit 32 so as not to be in the on-state at the same time.

In the first power supply mode, the FET 1 on the upper side is in the off-state and the FET 2 on the lower side is in the on-state. In the first power supply mode, the battery current IB from the main power supply 4 is supplied to the capacitor 45 and is supplied to the motor driving circuit 34 via the FET 2. In the first power supply mode, the FET 1 is in the off-state, so that the capacitor 45 does not discharge electric power to the motor driving circuit 34. In the first power supply mode, the motor drive voltage VMD is the output voltage V1.

In the second power supply mode, the FET 1 on the upper side is in the on-state and the FET 2 on the lower side is in the off-state. In the second power supply mode, the main power supply 4 and the auxiliary power supply device 40 (the capacitor 45) are connected in series with each other. In the second power supply mode, the motor driving circuit 34 is supplied with current discharged from the capacitor 45 in addition to the electric power from the main power supply 4. In the second power supply mode, the motor drive voltage VMD is the sum of the output voltage V1 and the output voltage V2 from the capacitor 45.

The operation of the switching circuit 46 will be described below. The switching circuit 46 makes a switchover between a first switching mode in which the main power supply 4 and the capacitor 45 are connected in series with each other and a second switching mode in which the main power supply 4 and the capacitor 45 are connected in parallel to each other, based on a combination of the on-state and the off-state of the FET 5 and the FET 6. The FET 5 and the FET 6 are controlled by the power supply management unit 32 so as not to be in the on-state at the same time.

In the first switching mode, the FET 5 is in the on-state and the FET 6 is in the off-state. In the first switching mode, discharging from the capacitor 45 to the main power supply 4 is interrupted by the switching circuit 46.

In the second switching mode, the FET 5 is in the off-state and the FET 6 is in the on-state. In the second switching mode, discharging from the capacitor 45 to the main power supply 4 is allowed by the switching circuit 46.

Figure 3:
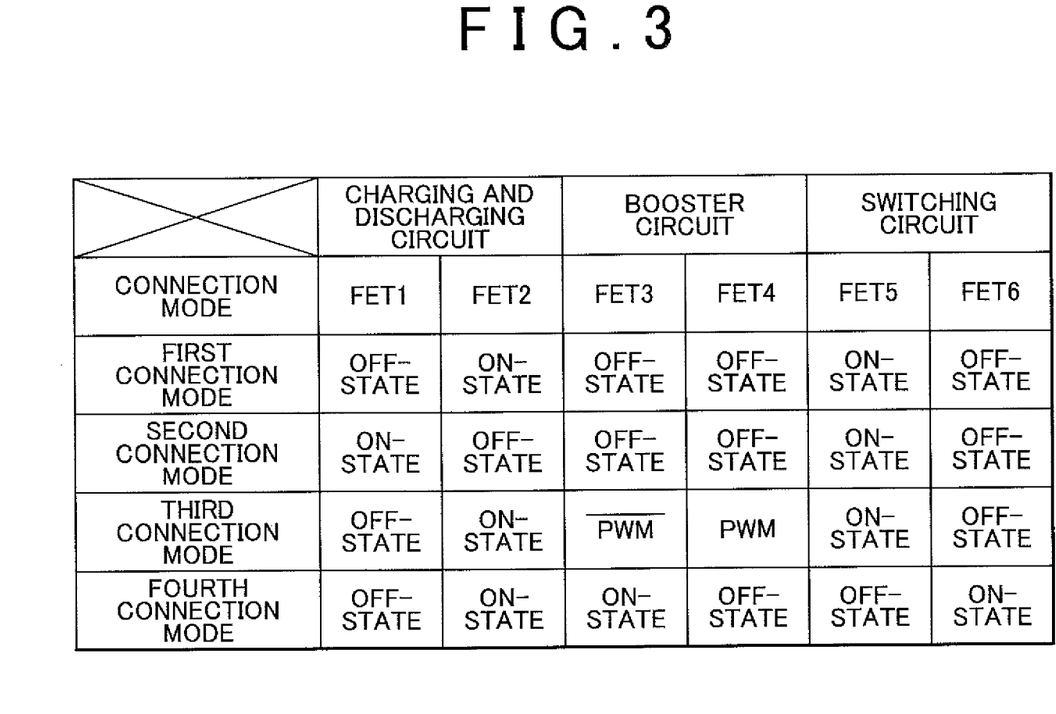
FIG. 3 is a table illustrating the relationship between the connection modes of the electric power steering system and the states of each switching element according to the embodiment.

With reference to FIG. 3 and FIG. 4, the mode of connection between the main power supply 4 and the auxiliary power supply device 40 (hereinafter referred to as "connection mode") will be described below. FIG. 4 illustrates the simplified circuit configuration of the EPS 1 and the main power supply 4. In the following description, the components related to the EPS 1 (not shown) indicate the components illustrated in FIG. 2.

The EPS 1 has a first connection mode, a second connection mode, a third connection mode, and a fourth connection mode as the connection modes. The second connection mode corresponds to a first supply mode. The first connection mode and the third connection mode correspond to a second supply mode. The fourth connection mode corresponds to a main power supply charging mode.

The first connection mode is set when the capacitor 45 is fully charged and when electric power is supplied from the main power supply 4 to the motor driving circuit 34. In the first connection mode, the booster circuit 43 is in a stopped state, the charging and discharging circuit 44 is in the first power supply mode, and the switching circuit 46 is in the first switching mode. More specifically, as illustrated in FIG. 3, in the first connection mode, the FET 1 is in the off-state, the FET 2 is in the on-state, the FET 3 is in the off-state, the FET 4 is in the off-state, the FET 5 is in the on-state, and the FET 6 is in the off-state.

Figure 4A:
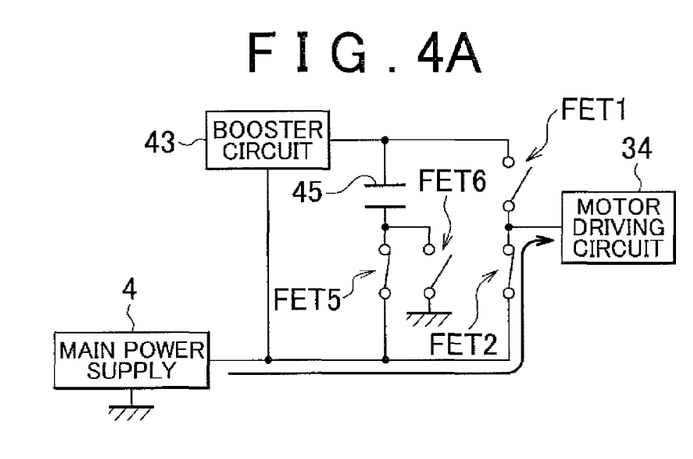
FIG. 4A is a circuit diagram illustrating the simplified circuit configuration of the electric power steering system according to the embodiment, and illustrating the circuit configuration in a first connection mode.

As illustrated in FIG. 4A, in the first connection mode, the electric power is supplied from the main power supply 4 to the motor driving circuit 34 via the FET 2. In the first connection mode, the electric power is not supplied from the main power supply 4 to the capacitor 45 because the capacitor 45 is fully charged. In the first connection mode, the motor drive voltage VMD is the output voltage V1.

The second connection mode is set when the electric power is supplied from the main power supply 4 and the capacitor 45 to the motor driving circuit 34. In the second connection mode, the booster circuit 43 is in the stopped state, the charging and discharging circuit 44 is in the second power supply mode, and the switching circuit 46 is in the first switching mode. More specifically, as illustrated in FIG. 3, in the second connection mode, the FET 1 is in the on-state, the FET 2 is in the off-state, the FET 3 is in the off-state, the FET 4 is in the off-state, the FET 5 is in the on-state, and the FET 6 is in the off-state.

Figure 4B:
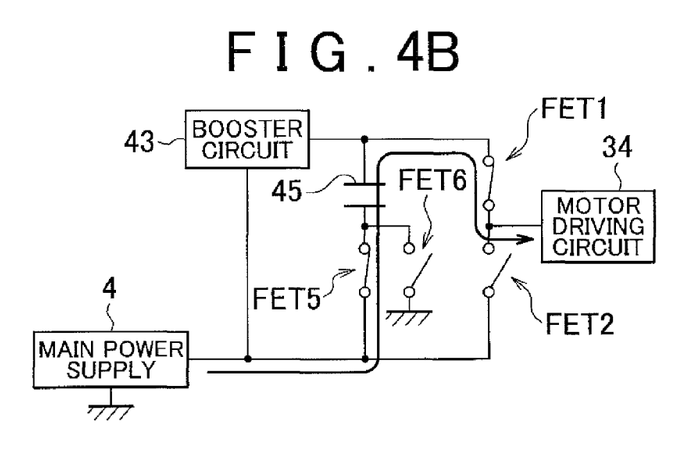
FIG. 4B is a circuit diagram illustrating the simplified circuit configuration of the electric power steering system according to the embodiment, and illustrating a circuit configuration in a second connection mode.

As illustrated in FIG. 4B, in the second connection mode, the electric power from the main power supply 4 passes through the capacitor 45 via the FET 5. At this time, the output voltage V2 of the capacitor 45 is superimposed on the output voltage V1 from the main power supply 4. The electric power from the main power supply 4 is then supplied to the motor driving circuit 34 via the FET 1. In the second power supply mode, the motor drive voltage VMD is the sum of the output voltage V1 and the output voltage V2.

The third connection mode is set when the capacitor 45 is charged with the electric power from the main power supply 4 and the electric power from the main power supply 4 is supplied to the motor driving circuit 34. In the third connection mode, the booster circuit 43 is in a driving state, the charging and discharging circuit 44 is in the first power supply mode, and the switching circuit 46 is in the first switching mode. More specifically, as illustrated in FIG. 3, in the third connection mode, the FET 1 is in the off-state, the FET 2 is in the on-state, the FET 4 is in a PWM driving state, the FET 3 is in a state where PWM driving is executed on the FET 3 such that the FET 3 and the FET 4 are not in the on-state at the same time, the FET 5 is in the on-state, and the FET 6 is in the off-state.

Figure 4C:
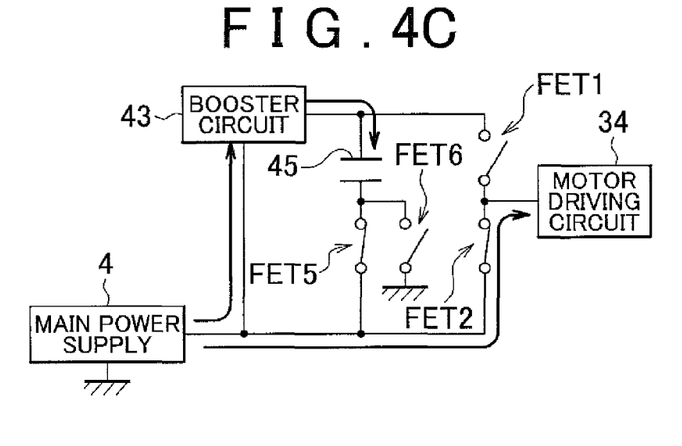
FIG. 4C is a circuit diagram illustrating the simplified circuit configuration of the electric power steering system according to the embodiment, and illustrating a circuit configuration in a third connection mode.

As illustrated in FIG. 4C, in the third connection mode, the electric power from the main power supply 4 is supplied to the capacitor 45 via the booster circuit 43. At this time, the output voltage V1 is boosted in the booster circuit 43, and the boosted voltage is applied to the capacitor 45. Therefore, the charging rate at which the capacitor 45 is charged is higher than that in the configuration in which the main power supply 4 and the capacitor 45 are connected in parallel to each other, that is, the configuration in which the booster circuit 43 is omitted. This reduces the time required to fully charge the capacitor 45. Further, the electric power from the main power supply 4 is supplied to the motor driving circuit 34 via the FET 2. In the third connection mode, the motor drive voltage VMD is the output voltage V1.

The fourth connection mode is set when the main power supply 4 is charged with electric power from the capacitor 45. In the fourth connection mode, the booster circuit 43 is in the stopped state, the capacitor 45 and the main power supply 4 are in the conductive state, the charging and discharging circuit 44 is in the first power supply mode, and the switching circuit 46 is in the second switching mode. More specifically, as illustrated in FIG. 3, in the fourth connection mode, the FET 1 is in the off-state, the FET 2 is in the on-state, the FET 3 is in the on-state, the FET 4 is in the off-state, the FET 5 is in the off-state, and the FET 6 is in the on-state.

Figure 4D:
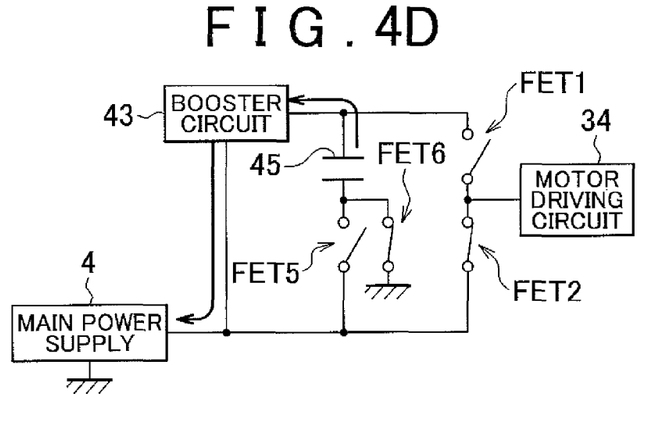
FIG. 4D is a circuit diagram illustrating the simplified circuit configuration of the electric power steering system according to the embodiment, and illustrating a circuit configuration in a fourth connection mode.

As illustrated in FIG. 4D, the main power supply 4 and the capacitor 45 are connected in parallel to each other in the fourth connection mode. Accordingly, when the voltage of the capacitor 45 is higher than the voltage of the main power supply 4, the electric power from the capacitor 45 is supplied to the main power supply 4 via the booster circuit 43. Because the FET 5 is in the off-state and the FET 1 is in the off-state, the electric power is not supplied from the capacitor 45 to the motor driving circuit 34.

Figure 5:
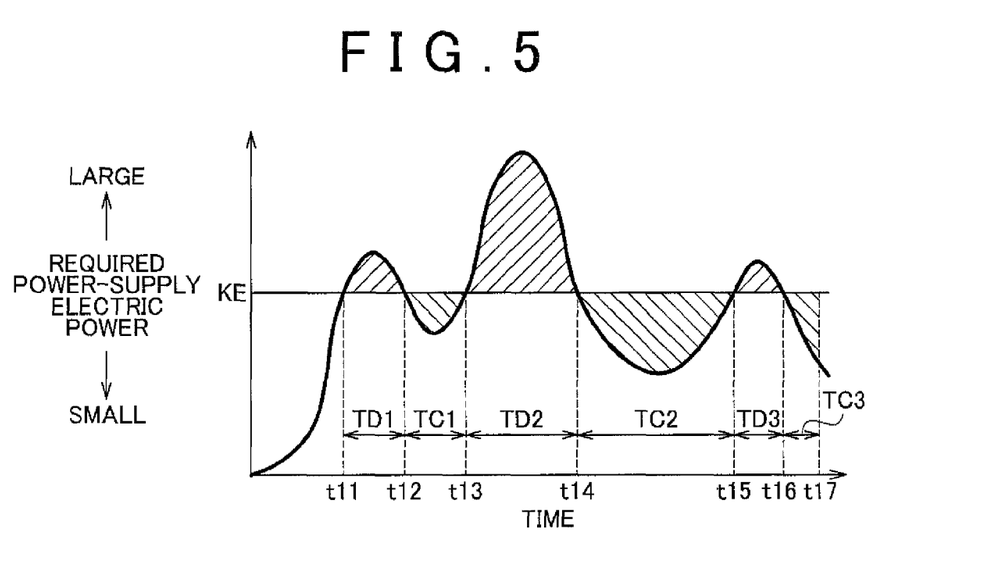
FIG. 5 is a graph related to the electric power steering system according to the embodiment, and illustrating a transition of a required power-supply electric power.
Figure 6:
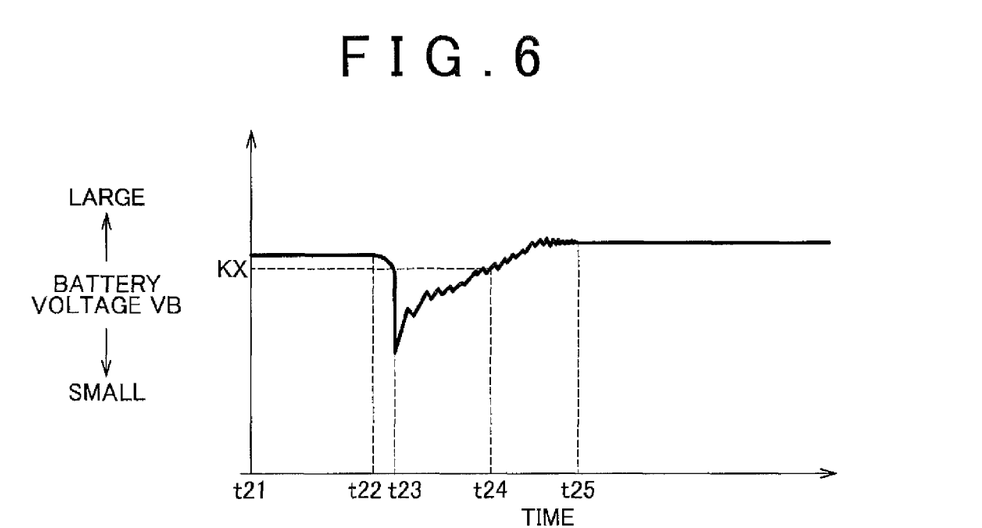
FIG. 6 is a graph related to the electric power steering system according to the embodiment, and illustrating a transition of the battery voltage.

With reference to FIG. 5 and FIG. 6, the control for changing the connection mode, which is executed by the control device 30, will be described below. In the following description with reference to FIG. 5 and FIG. 6, the components related to the EPS 1 to which the reference symbols are assigned indicate the components illustrated in FIG. 1 or FIG. 2.

FIG. 5 illustrates a transition of power-supply electric power that the EPS 1 requires the main power supply 4 to supply in order to execute assist control. In FIG. 5, a first discharging period TD1 indicates a period from time t11 to time t12. A first charging period TC1 indicates a period from time t12 to time t13. A second discharging period TD2 indicates a period from time t13 to time t14. A second charging period TC2 indicates a period from time t14 to time t15. A third discharging period TD3 indicates a period from time t15 to time t16. A third charging period TC3 indicates a period from time t16 to time t17.

Hereinafter, actual power-supply electric power supplied from the main power supply 4 to the EPS 1 is referred to as power-supply electric power PS. The power-supply electric power PS is calculated by the power supply management unit 32 based on the battery current IB detected by the current sensor 42.

The control device 30 changes the connection mode to the first connection mode, the second connection mode, or the third connection mode, based on the relationship between the power-supply electric power PS and a charging and discharging threshold KE. More specifically, when the power-supply electric power PS is less than the charging and discharging threshold KE, that is, when the capacitor 45 is fully charged in the first charging period TC1, the second charging period TC2, and the third charging period TC3, the control device 30 sets the connection mode to the first connection mode. When the capacitor 45 is not fully charged in the first charging period TC1, the second charging period TC2, and the third charging period TC3, the control device 30 sets the connection mode to the third connection mode. When the power-supply electric power PS is equal to or greater than the charging and discharging threshold KE, that is, in the first discharging period TD1, the second discharging period TD2, and the third discharging period TD3, the control device 30 sets the connection mode to the second connection mode. Note that examples of a case where the power-supply electric power PS is equal to or greater than the charging and discharging threshold KE include a case where a driver performs stationary steering (steering operation performed while a vehicle is not travelling) of the steering wheel 2 while the vehicle is being placed in a garage or the vehicle is being parked. Further, the power-supply electric power PS is equal to or greater than the charging and discharging threshold KE, for example, in a period from time t11, t13, or t15, in which the connection mode is changed to the second connection mode.

When the control device 30 changes the connection mode to the first connection mode, the second connection mode, or the third connection mode, the peak of the power-supply electric power PS (the battery current IB) is restricted at the charging and discharging threshold KE (peak-cut). Consequently, a load on the main power supply 4 is reduced.

FIG. 6 illustrates a transition of the voltage of the main power supply 4 (hereinafter referred to as a battery voltage VB) in a case where the vehicle is switched from the state where stop-start (idling reduction) is executed to the state where stop-start is cancelled. In FIG. 6, stop-start is executed in the vehicle in a period from time t21 to time t22, and the stop-start is cancelled at time t22. That is, in the vehicle, the alternator 4B is stopped in the period from time t21 to time t22. Therefore, the battery voltage VB is the voltage of the in-vehicle battery 4A in the period from time t21 to time t22. In the vehicle, driving of the starter motor 5 is started at time t22. In the vehicle, after time t23, the alternator 4B of the main power supply 4 generates electric power as the crankshaft is rotated by the driving of the starter motor 5. The electric power is supplied from the alternator 4B to the in-vehicle battery 4A of the main power supply 4.

At time t22, the electric power from the in-vehicle battery 4A is consumed by the driving of the starter motor 5. Because the internal combustion engine is stopped at time t22, the alternator 4B does not supply electric power to the in-vehicle battery 4A. Accordingly, the battery voltage VB abruptly decreases in a period from time t22 to time t23. After time t23, the electric power is supplied from the alternator 4B to the in-vehicle battery 4A, so that the voltage of the in-vehicle battery 4A is boosted as time passes from time t23. After time t25, the voltage of the main power supply 4 is constant. Note that, in the following description, the period from time t22 to time t23 is referred to as a voltage drop period.

Because the voltage of the in-vehicle battery 4A decreases in the voltage drop period, the voltage applied to auxiliaries (not shown) for driving an air conditioner and acoustic equipment of the vehicle decreases. Therefore, there is a possibility that the electric power for driving the auxiliaries will not be supplied sufficiently from the in-vehicle battery 4A.

In order to deal with this problem, a booster circuit such as a DC-DC converter may be added to driving circuits (not shown) for driving the auxiliaries. However, in a case where the booster circuit is added to the driving circuit of each auxiliary, the number of components of each auxiliary increases, resulting in cost increase.

The EPS 1 according to the present embodiment is configured such that, in the voltage drop period, that is, when the starter motor 5 is driven, the control device 30 executes connection mode setting control for setting the connection mode to the fourth connection mode. In the voltage drop period, the electric power is supplied from the capacitor 45 to the in-vehicle battery 4A. This suppresses an abrupt decrease in the battery voltage VB. Accordingly, a decrease in the voltage to be applied to each auxiliary is suppressed, so that sufficient electric power is supplied to each auxiliary without adding any booster circuit to each auxiliary.

After the connection mode is set to the fourth connection mode, in the EPS 1, the fourth connection mode is maintained until the battery voltage VB reaches a reference value KX. When the battery voltage VB reaches the reference value KX (at time t24), the connection mode is changed from the fourth connection mode to the third connection mode, in the EPS 1. Thus, in the EPS 1, the capacitor 45 is charged. The reference value KX indicates a battery voltage VB at which required electric power can be supplied to the auxiliaries. The reference value KX is set in advance through testing or the like.

Figure 7:
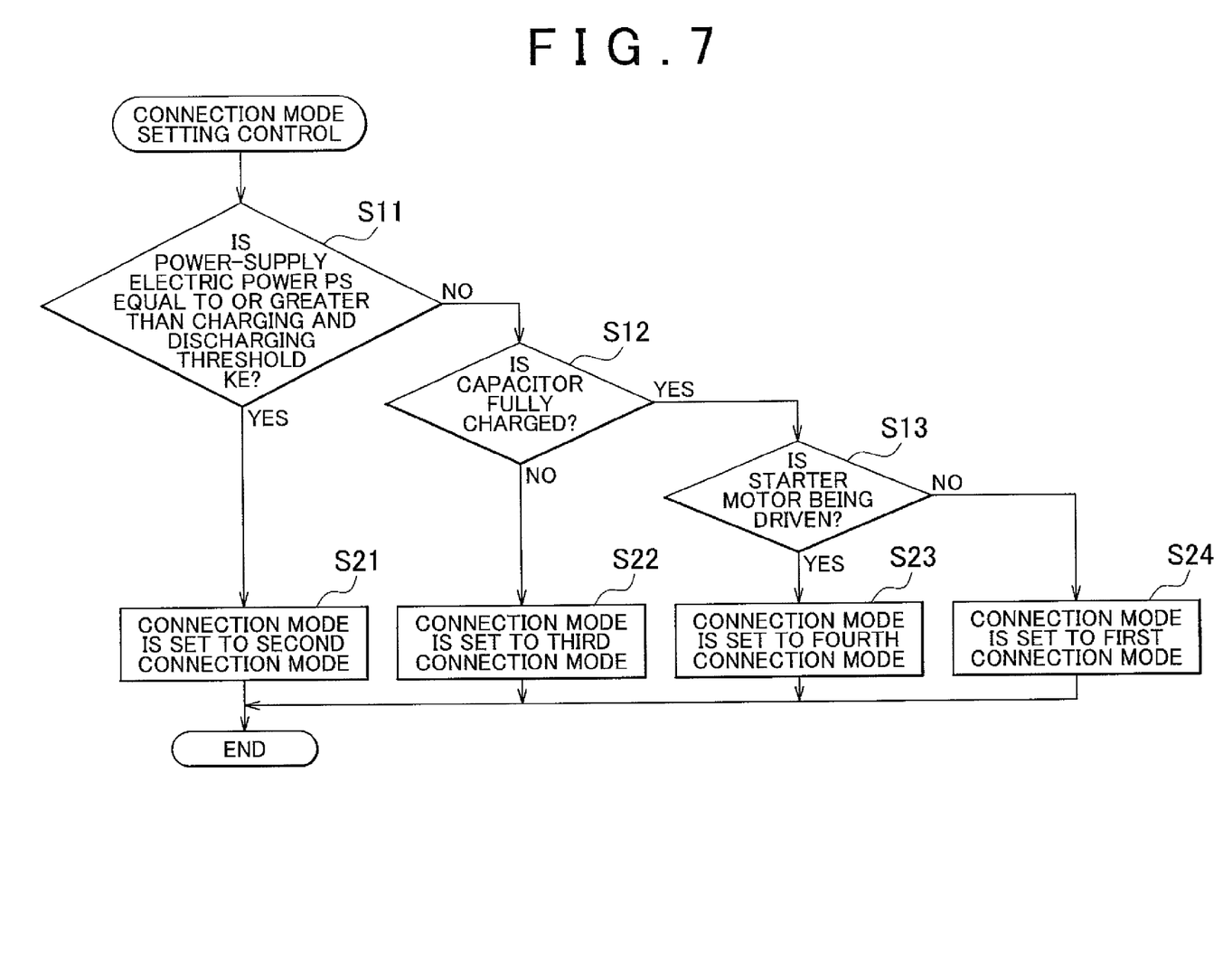
FIG. 7 is a flowchart illustrating the procedure of a connection mode setting control executed by a control device according to the embodiment.

With reference to FIG. 7, a process of the connection mode setting control will be described. Note that in the following description with reference to FIG. 7, the components related to the EPS 1, to which the reference symbols are assigned, indicate the components illustrated in FIG. 1 or FIG. 2. The connection mode setting control is executed repeatedly at predetermined intervals.

In the connection mode setting control, the control device 30 sets the connection mode to one of the first to fourth connection modes in corresponding one of step S21 to S24 based on a determination in the steps S11 to S13.

In step S11, the control device 30 determines whether the power-supply electric power PS is equal to or greater than the charging and discharging threshold KE. In step S12, the control device 30 determines whether the capacitor 45 is fully charged. The power supply management unit 32 of the control device 30 calculates the output voltage V2 based on an output signal from the voltage sensor 47. When the output voltage V2 is equal to or greater than a threshold corresponding to the full charge of the capacitor 45, the power supply management unit 32 determines that the capacitor 45 is fully charged. When the output voltage V2 is smaller than the threshold, the power supply management unit 32 determines that the capacitor 45 is not fully charged. Note that the threshold is set in advance on the basis of the type of the capacitor 45.

In step S13, the control device 30 determines whether the starter motor 5 is being driven. The control device 30 receives a signal indicating the driving state of the starter motor 5 from a control device (not shown) of the vehicle, for example, via a CAN communication. When the control device 30 receives a signal indicating that the starter motor 5 is being driven (hereinafter referred to as "self-starter driving signal SSD"), the control device 30 determines that the starter motor 5 is being driven. When the control device 30 has not received the self-starter driving signal SSD, the control device 30 determines that the starter motor 5 is in a stopped state.

If an affirmative determination is made in step S11, the control device 30 sets the connection mode to the second connection mode, in step S21. If a negative determination is made in each of step S11 and step S12, the control device 30 sets the connection mode to the third connection mode, in step S22.

If a negative determination is made in step S11, an affirmative determination is made in step S12, and an affirmative determination is made in step S13, the control device 30 sets the connection mode to the fourth connection mode, in step S23.

If a negative determination is made in step S11, an affirmative determination is made in step S12, and a negative determination is made in step S13, the control device 30 sets the connection mode to the first connection mode, in step S24.

The EPS 1 according to the present embodiment produces the following advantageous effects. The EPS 1 includes the switching circuit 46 capable of switching the connection mode to a mode in which the auxiliary power supply device 40 and the main power supply 4 are connected in parallel to each other. With this configuration, in the EPS 1, the electric power can be supplied from the capacitor 45 to the in-vehicle battery 4A.

In the connection mode setting control, the connection mode is set to the fourth connection mode at the time of driving the starter motor 5, in the EPS 1. With this configuration, it is possible to suppress an abrupt decrease in the battery voltage VB, which would be caused due to the driving of the starter motor 5. Accordingly, required electric power is supplied to each auxiliary even if a booster circuit is not added to each auxiliary.

In the connection mode setting control, the connection mode is set to the second connection mode in the EPS 1, when the power-supply electric power PS is equal to or greater than the charging and discharging threshold KE. With this configuration, when the EPS 1 requires a large amount of electric power in order to execute, for example, stationary steering, the peak of the battery current IB of the power-supply electric power PS is restricted (peak-cut) by boosting the motor drive voltage VMD. This accordingly reduces a load on the main power supply 4.

The auxiliary power supply device 40 includes the booster circuit 43. With this configuration, the capacitor 45 is charged more quickly in the EPS 1 than in a configuration in which the electric power is supplied from the main power supply 4 to the capacitor 45 by connecting the capacitor 45 in parallel to the main power supply 4, that is, a configuration in which the booster circuit 43 is omitted.

The electric power steering system according to the invention may be implemented in embodiments other than the aforementioned embodiment. Modified examples of the above-described embodiment will be described as the other embodiments of the electric power steering system according to the invention. Note that the following modified examples may be combined with each other.

Figure 8:
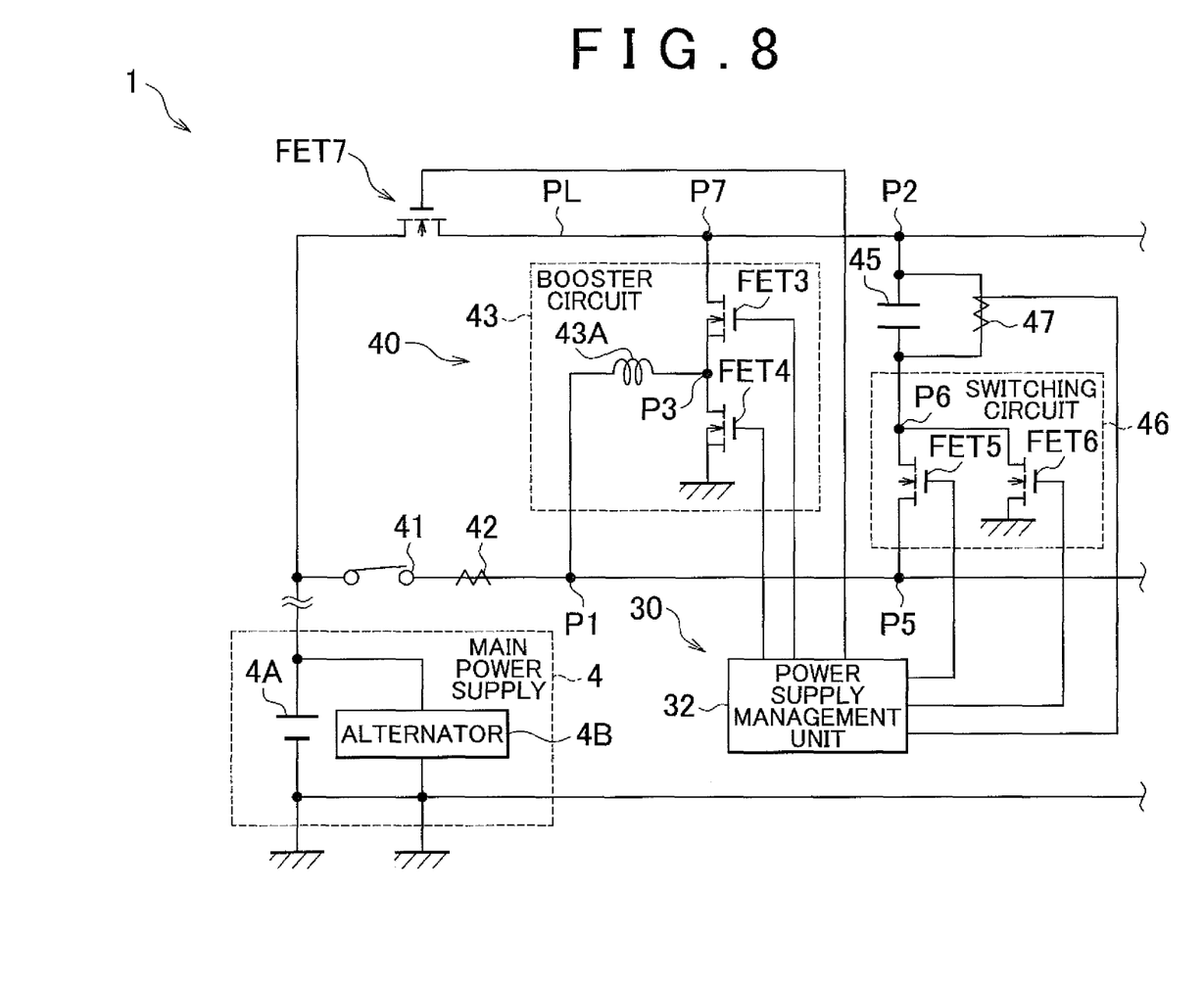
FIG. 8 is a circuit diagram illustrating the circuit configuration of an electric power steering system according to another embodiment of the invention.

In the EPS 1 according to the aforementioned embodiment, the electric power is supplied from the capacitor 45 to the in-vehicle battery 4A of the main power supply 4 via the boosting coil 43A of the booster circuit 43 when the connection mode is the fourth connection mode. However, the supply passage of the electric power from the capacitor 45 to the in-vehicle battery 4A is not limited to the one described in the aforementioned embodiment. For example, in an EPS 1 according to a modified example, electric power is supplied from the capacitor 45 to the in-vehicle battery 4A without passing through the booster circuit 43. More specifically, as illustrated in FIG. 8, the EPS 1 according to the modified example includes an electric power supply line PL that connects the main power supply 4 to a connecting point P7 with the FET 3 of the booster circuit 43, and a switching element (hereinafter referred to as "FET 7") connected in series with the main power supply 4 and the capacitor 45 via the electric power supply line PL. In the EPS 1 according to the modified example, when the connection mode is the first connection mode, the second connection mode, or the third connection mode, the FET 7 is in the off-state, that is, the main power supply 4 and the capacitor 45 are not electrically connected to each other via the electric power supply line PL. In the EPS 1 according to the modified example, when the connection mode is the fourth connection mode, the FET 7 is in the on-state, that is, the main power supply 4 and the capacitor 45 are electrically connected to each other via the electric power supply line PL. Accordingly, the electric power is supplied from the capacitor 45 to the in-vehicle battery 4A via the electric power supply line PL. In the EPS 1 according to the modified example, the FET 3 is in the off-state when the connection mode is the fourth connection mode.

In the EPS 1 according to the aforementioned embodiment, when the connection mode is the first connection mode, the FET 5 may be placed in the off-state.

In the vehicle in the aforementioned embodiment, the crankshaft of the internal combustion engine may be rotated by the alternator 4B instead of the starter motor 5. When the crankshaft is rotated by the alternator 4B, it is determined whether the alternator 4B is being driven, instead of making a determination on whether the starter motor 5 is being driven, in step S13 in the connection mode setting control.

In the connection mode setting control, upon reception of the self-starter driving signal SSD, it is determined that the stator motor 5 is being driven, in the EPS 1 according to the aforementioned embodiment. However, the configuration in which it is determined that the starter motor 5 is being driven is not limited to the one described in the aforementioned embodiment. For example, in an EPS 1 according to a modified example, it is determined that the starter motor 5 is being driven, when the control device 30 receives a driving signal by which a control device of the vehicle controls driving of the starter motor 5.

After the connection mode is set to the fourth connection mode, in the EPS 1 according to the aforementioned embodiment, the connection mode is changed from the fourth connection mode to the third connection mode when the battery voltage VB reaches the reference value KX. However, the timing at which the connection mode is changed from the fourth connection mode to the third connection mode is not limited to the one described in the aforementioned embodiment. For example, in an EPS 1 according to a modified example, the connection mode is changed from the fourth connection mode to the third connection mode, when a predetermined period of time has passed after the connection mode is set to the fourth connection mode.

In the EPS 1 according to the aforementioned embodiment, it is determined whether the starter motor 5 is being driven, in step S13 in the connection mode setting control. However, the content of step S13 in the connection mode setting control is not limited to the one described in the aforementioned embodiment. For example, in an EPS 1 according to a modified example, it is determined whether the rate of drop of the battery voltage VB is equal to or higher than a threshold, instead of making a determination on whether the starter motor 5 is being driven, in step S13 in the connection mode setting control. Note that the threshold is a voltage drop rate at which there is a possibility that sufficient electric power will not be supplied due to a decrease in the battery voltage VB. The threshold is set in advance through testing or the like.

The EPS 1 according to the aforementioned embodiment may include a plurality of the auxiliary power supply devices 40.

The auxiliary power supply device 40 according to the aforementioned embodiment includes the capacitor 45 as an auxiliary power supply. However, the configuration of the auxiliary power supply device 40 is not limited to the one described in the aforementioned embodiment. For example, an auxiliary power supply device 40 according to a modified example includes a secondary battery such as a lithium ion battery instead of the capacitor 45.

As the capacitor 45 according to the aforementioned embodiment, an electric double layer capacitor is used. However, the type of the capacitor 45 is not limited to the one described in the aforementioned embodiment. For example, as a capacitor 45 in a modified example, a lithium ion capacitor is employed instead of the electric double layer capacitor.

In the charging and discharging circuit 44 according to the aforementioned embodiment, MOSFETs are employed as the FET 1 and the FET 2. However, the type of the FET 1 and the FET 2 is not limited to the one described in the aforementioned embodiment. For example, in a charging and discharging circuit 44 according to a modified example, switching elements having other configurations, such as IGBTs, are used as the FET 1 and the FET 2. Note that the FET 5 and the FET 6 of the switching circuit 46 may be modified in a similar manner.

The electric motor 21 according to the aforementioned embodiment has a configuration of a three-phase brushless motor. However, the configuration of the electric motor 21 is not limited to the one described in the aforementioned embodiment. For example, an electric motor 21 according to a modified example has a configuration of a motor with brush.

The EPS 1 according to the aforementioned embodiment has a column-assist type configuration. However, the configuration of the EPS 1 is not limited to the one described in the aforementioned embodiment. For example, an EPS 1 in a modified example has a configuration of a pinion assist type, a dual pinion assist type, a rack coaxial type, or a rack parallel type.

What is claimed is:

1. An electric power steering system, comprising:
    an electric motor that generates assist torque based on steering torque;
    a main power supply that supplies electric power to the electric motor;
    an auxiliary power supply device including an auxiliary power supply connected to the main power supply and capable of discharging electric power to the electric motor; and
    a control device that controls an operation of the auxiliary power supply device, wherein:
    the control device switches a mode, as a mode of connection between the main power supply and the auxiliary power supply device, among a first supply mode in which the main power supply and the auxiliary power supply are connected in series with each other and a high-potential side of the auxiliary power supply is connected to the electric motor, a second supply mode in which the main power supply and the auxiliary power supply are connected in series with each other and a low-potential side of the auxiliary power supply is connected to the electric motor, and a main power supply charging mode in which the main power supply and the auxiliary power supply are connected in parallel to each other, the main power supply charging mode being a mode in which the auxiliary power supply charges the main power supply.

2. The electric power steering system according to claim 1, wherein when an engine of a vehicle is stopped and a starter that starts the engine is driven, the control device switches the connection mode to the main power supply charging mode.

3. The electric power steering system according to claim 1, wherein when a rate of drop of a voltage of the main power supply is equal to or higher than a threshold, the control device switches the connection mode to the main power supply charging mode.

4. The electric power steering system according to claim 2, wherein the control device switches the connection mode to the main power supply charging mode when power-supply electric power consumed by the electric power steering system due to assist control for assisting steering is less than a charging and discharging threshold, which is a reference value for making a switchover between charging from the main power supply to the auxiliary power supply and discharging from the auxiliary power supply to the electric motor.

5. The electric power steering system according to claim 3, wherein the control device switches the connection mode to the main power supply charging mode when power-supply electric power consumed by the electric power steering system due to assist control for assisting steering is less than a charging and discharging threshold, which is a reference value for making a switchover between charging from the main power supply to the auxiliary power supply and discharging from the auxiliary power supply to the electric motor.

6. The electric power steering system according to claim 1, further comprising:
a first switching element that makes a switchover between an on-state in which the main power supply and the auxiliary power supply are in a conductive state and an off-state in which the main power supply and the auxiliary power supply are in a non-conductive state; and
a second switching element of which one end is connected to a connecting point between the first switching element and the auxiliary power supply and of which the other end is grounded, the second switching element making a switchover between an on-state in which the connecting point between the first switching element and the auxiliary power supply is in a grounded state and an off-state in which the connecting point is not in the grounded state, wherein
in the first supply mode and the second supply mode, the control device places the first switching element in the on-state and the second switching element in the off-state, and in the main power supply charging mode, the control device places the first switching element in the off-state and the second switching element in the on-state.

7. The electric power steering system according to claim 2, further comprising:
a first switching element that makes a switchover between an on-state in which the main power supply and the auxiliary power supply are in a conductive state and an off-state in which the main power supply and the auxiliary power supply are in a non-conductive state; and
a second switching element of which one end is connected to a connecting point between the first switching element and the auxiliary power supply and of which the other end is grounded, the second switching element making a switchover between an on-state in which the connecting point between the first switching element and the auxiliary power supply is in a grounded state and an off-state in which the connecting point is not in the grounded state, wherein
in the first supply mode and the second supply mode, the control device places the first switching element in the on-state and the second switching element in the off-state, and in the main power supply charging mode, the control device places the first switching element in the off-state and the second switching element in the on-state.

8. The electric power steering system according to claim 3, further comprising:
a first switching element that makes a switchover between an on-state in which the main power supply and the auxiliary power supply are in a conductive state and an off-state in which the main power supply and the auxiliary power supply are in a non-conductive state; and
a second switching element of which one end is connected to a connecting point between the first switching element and the auxiliary power supply and of which the other end is grounded, the second switching element making a switchover between an on-state in which the connecting point between the first switching element and the auxiliary power supply is in a grounded state and an off-state in which the connecting point is not in the grounded state, wherein
in the first supply mode and the second supply mode, the control device places the first switching element in the on-state and the second switching element in the off-state, and in the main power supply charging mode, the control device places the first switching element in the off-state and the second switching element in the on-state.

9. The electric power steering system according to claim 4, further comprising:
a first switching element that makes a switchover between an on-state in which the main power supply and the auxiliary power supply are in a conductive state and an off-state in which the main power supply and the auxiliary power supply are in a non-conductive state; and
a second switching element of which one end is connected to a connecting point between the first switching element and the auxiliary power supply and of which the other end is grounded, the second switching element making a switchover between an on-state in which the connecting point between the first switching element and the auxiliary power supply is in a grounded state and an off-state in which the connecting point is not in the grounded state, wherein
in the first supply mode and the second supply mode, the control device places the first switching element in the on-state and the second switching element in the off-state, and in the main power supply charging mode, the control device places the first switching element in the off-state and the second switching element in the on-state.

10. The electric power steering system according to claim 5, further comprising:
a first switching element that makes a switchover between an on-state in which the main power supply and the auxiliary power supply are in a conductive state and an off-state in which the main power supply and the auxiliary power supply are in a non-conductive state; and a second switching element of which one end is connected to a connecting point between the first switching element and the auxiliary power supply and of which the other end is grounded, the second switching element making a switchover between an on-state in which the connecting point between the first switching element and the auxiliary power supply is in a grounded state and an off-state in which the connecting point is not in the grounded state, wherein in the first supply mode and the second supply mode, the control device places the first switching element in the on-state and the second switching element in the off-state, and in the main power supply charging mode, the control device places the first switching element in the off-state and the second switching element in the on-state.

\* \* \* \* \*